(12) United States Patent
Dietz et al.

(10) Patent No.: US 9,860,121 B2
(45) Date of Patent: Jan. 2, 2018

(54) SYSTEM AND METHOD FOR PROCESSING BANK NOTES

(71) Applicant: GIESECKE & DEVRIENT GMBH, Munich (DE)

(72) Inventors: Jurgen Dietz, Munich (DE); Holger Knopf, Stockdorf (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 58 days.

(21) Appl. No.: 14/364,730

(22) PCT Filed: Dec. 19, 2012

(86) PCT No.: PCT/EP2012/005278
§ 371 (c)(1),
(2) Date: Jun. 12, 2014

(87) PCT Pub. No.: WO2013/091861
PCT Pub. Date: Jun. 27, 2013

(65) Prior Publication Data
US 2014/0325044 A1 Oct. 30, 2014

(30) Foreign Application Priority Data
Dec. 23, 2011 (DE) .................. 10 2011 122 247

(51) Int. Cl.
G06F 15/177 (2006.01)
H04L 12/24 (2006.01)
G07F 19/00 (2006.01)
G07D 11/00 (2006.01)

(52) U.S. Cl.
CPC ...... *H04L 41/0813* (2013.01); *G07D 11/0078* (2013.01); *G07D 11/0081* (2013.01); *G07F 19/211* (2013.01)

(58) Field of Classification Search
None
See application file for complete search history.

(56) References Cited

U.S. PATENT DOCUMENTS

| 6,672,505 B1 | 1/2004 | Steinmetz et al. | |
| 8,251,196 B2 | 8/2012 | Dietz et al. | |
| 2002/0026426 A1* | 2/2002 | Bennett | G06F 17/30861 705/64 |
| 2003/0217005 A1* | 11/2003 | Drummond | G06F 3/023 705/43 |
| 2007/0152034 A1* | 7/2007 | Dietz | G07D 7/00 235/379 |
| 2009/0212105 A1 | 8/2009 | Couper et al. | |
| 2011/0129139 A1* | 6/2011 | Numata | G07D 7/0006 382/137 |
| 2012/0320793 A1* | 12/2012 | Balbierer | H04L 12/12 370/254 |

FOREIGN PATENT DOCUMENTS

| DE | 19824435 A1 | 12/1999 |
| DE | 10360887 A1 | 7/2005 |
| DE | 10360861 A1 | 8/2005 |

OTHER PUBLICATIONS

International Preliminary Report on Patentability for International PCT Application No. PCT/EP2012/005278, dated Jun. 24, 2014.
International Search Report for corresponding International PCT Application No. PCT/EP2012/005278, dated May 2013.
German Search Report from the DE Application No. 102011122247.6, dated Sep. 6, 2012.
Stallings, "SNMP and SNMPv2: The Infrastructure for Network Management", IEEE Communications Magazine, Mar. 1998, pp. 37-43.
Symborski, "Updating Software and Configuration Data in a Distributed Communications Network", IEEE, 1988, pp. 331-338.

* cited by examiner

*Primary Examiner* — Brian Whipple
(74) *Attorney, Agent, or Firm* — Justin Cassell; Workman Nydegger (57) ABSTRACT

A system and a method for processing value documents comprises a multiplicity of bank-note processing machines connected and arranged to communicate with each other via a communication network, and which respectively have stored therein configuration data defining the operating configuration of a respective bank-note processing machine. At least a first bank-note processing machine is logically associated with a first local access service module, and at least a second bank-note processing machine is logically associated with a second local access service module. The system comprises a central master access service module having configuration data stored therein and in communication via the communication network with the first local access service module and the second local access service module. A change of the configuration data stored in the central master access service module leads to the configuration of the first bank-note processing machine and of the second bank-note processing machine being changed.

19 Claims, 3 Drawing Sheets

SYSTEM AND METHOD FOR PROCESSING BANK NOTES

FIELD OF THE INVENTION

The present invention relates to a system and a method for processing value documents, in particular bank notes. The term "processing" of value documents or bank notes is understood here to be in particular the counting, checking and sorting of value documents or bank notes.

The present invention is employable in principle without restriction for any kind of sheet-like value documents. However, a special focus of the present invention lies on bank notes, so that hereinbelow the term "bank notes" will normally be employed for simplicity's sake instead of the general term "value documents", but this is not to be understood in a restrictive manner.

BACKGROUND

For processing bank notes there are employed bank-note processing machines which usually consist of a plurality of portions or processing zones which are disposed one after the other and perform different working steps. The number, kind and arrangement of the portions can vary depending on the requirements for the processing of the bank notes. Typically, a bank-note processing machine comprises at least an input portion with an input pocket, an operator control portion as well as an output portion having a plurality of output pockets. After being input into the input pocket, the bank notes are singled in the input portion and captured by sensors in a checking device in order to recognize those bank notes that are no longer fit for taking part in bank-note circulation. These are separated from the bank notes that are fit for circulation and are output separately or destroyed, where applicable. The bank notes fit for circulation are transported further by means of a transport system of the bank-note processing machine and output in the output pockets of the output portion, being sorted for example according to the value of a bank note. Optionally, such a bank-note processing machine can have a shredder module for destroying selected bank notes and/or modules for stacking or bundling processed bank notes. The sequence of the bank-note processing can be controlled and monitored by the operating person via a user interface which is usually located in the operator control portion of the bank-note processing machine and can be adapted for example as a touchscreen.

In particular when bank-note processing machines are used by central banks or major banks, there frequently occurs the case that a plurality of partly identical bank-note processing machines are operated at different sites which can be a far distance apart. Here there is often the wish to hold uniform configuration data for operating the bank-note processing machines on all these bank-note processing machines (or at least a portion thereof) at the different sites. The term "configuration data" is understood here as a general term for all kinds of data relating to the operation of a bank-note processing machine, e.g. operating data which define the operating parameters (such as e.g. the processing speed) of a bank-note processing machine, classification data which define parameters for classifying bank notes, security setting data which define the security settings (such as e.g. the password length) of a bank-note processing machine, and the like.

SUMMARY

Against this background, the present invention is based on the object of providing a system and a method allowing a multiplicity of bank-note processing machines at different sites to be provided in a fail-safe and automatic manner with configuration data for operating a respective bank-note processing machine, to thereby synchronize the bank-note processing machines and be able to ensure a uniform operation of the multiplicity of bank-note processing machines.

This object is achieved according to the invention by the subject matter of claim 1. A corresponding method for processing bank notes is the subject matter of the independent method claim. Advantageous developments of the invention are defined in the subclaims.

According to a first aspect of the invention, there is provided a system for processing value documents, in particular bank notes. The system comprises a multiplicity of bank-note processing machines which are connected and can communicate with each other via a communication network and which respectively have stored therein configuration data which define the operating configuration of a respective bank-note processing machine. At least a first bank-note processing machine is logically associated with a first local access service module, and at least a second bank-note processing machine is logically associated with a second local access service module. Further, the system comprises a central master access service module which likewise has configuration data stored therein and which is in communication with the first local access service module and the second local access service module via the communication network. The central master access service module, the first local access service module and the second local access service module define a logical hierarchy of access service modules in the form of a tree structure, in which the central master access service module constitutes the root of the tree structure and is adapted such that a change of the configuration data stored in the central master access service module leads to the changed configuration data being automatically transferred via the hierarchy of access service modules and the first and second local access service modules contained therein to the first bank-note processing machine and the second bank-note processing machine, and leading there to a change of the configuration data and thus of the configuration of the first bank-note processing machine and of the second bank-note processing machine.

In those levels of the hierarchy of access service modules in the form of a tree structure that lie below the root, i.e. the central master access service module, both the first and second local access service modules, along with further local access service modules, and bank-note processing machines can be disposed and thus be logically associated with the central master access service module. On the respective leaves of the hierarchy of access service modules in the form of a tree structure there is preferably respectively disposed a bank-note processing machine which is associated with a local access service module (or, where applicable, the central master access service module) of a higher level of the hierarchy of access service modules. The local access service modules of a lower level are logically associated with the local access service modules of the next higher level.

The "distribution" of uniform configuration data thus preferably begins at the central master access service module, which ensures that the configuration data are first relayed in a fail-safe manner to the local access service modules and bank-note processing machines logically associated with the central master access service module, to be relayed from there to bank-note processing machines and/or further local access service modules of a lower level. In this manner, the configuration data are propagated "downward" along the logical hierarchy defined by the access service modules.

The local access service modules are preferably adapted as software which is stored and executed on a respective local server. Preferably, a local server on which a local access service module is stored, together with the at least one bank-note processing machine that is logically associated with this local access service module, is part of a local network. Alternatively or additionally, a local access service module can be adapted as software which is stored and executed on one of the multiplicity of bank-note processing machines. According to yet another alternative, an access service module can be adapted substantially as hardware e.g. in the form of an access service gateway.

Preferably, the central master access service module is stored as software on a central server and executed there. Alternatively, the central master access service module can also be implemented on one of the multiplicity of bank-note processing machines.

According to an alternative embodiment, it is conceivable that the central master access service module is arranged for distributing the changed configuration data only to selected local access service modules and/or selected bank-note processing machines. A corresponding filter function can additionally or alternatively also be implemented on the local access service modules.

According to a preferred embodiment, the central master access service module is adapted for providing the changed configuration data with activation times and/or deactivation times such that a bank-note processing machine can be operated with the changed configuration data only within a period of validity defined by an activation time and/or a deactivation time. This makes it possible to define through the central master access service module for example a time that is uniform for all bank-note processing machines as of when changed configuration data can be employed for operation.

According to a preferred embodiment, connection data for setting up a connection with the local access service module with which a bank-note processing machine is associated, e.g. the IP address of this local access service module, are stored in the bank-note processing machine. In this case, the logical association of a bank-note processing machine with a local access service module is effected by reason of the connection data stored in the bank-note processing machine. Alternatively, a bank-note processing machine can be adapted for searching independently for a local access service module, e.g. in the LAN in which the bank-note processing machine is integrated.

Preferably, a respective bank-note processing machine is adapted for automatically logging in, at the start-up of the bank-note processing machine, to the local access service module with which the bank-note processing machine is logically associated, and logging out from this local access service module again when the bank-note processing machine is switched off. Since the connection data stored in a bank-note processing machine can further contain e.g. the IP address of the bank-note processing machine, the log-in at the start-up of a bank-note processing machine can preferably be effected by the bank-note processing machine transmitting the connection data stored there, including the bank-note processing machine's IP address, to the local access service module with which this bank-note processing machine is logically associated.

In this connection, a respective local access service module is preferably adapted for relaying the connection data which such a local access service module receives from the bank-note processing machines and/or from the local access service modules of a lower level which are logically associated with this local access service module, to the local access service module of a higher level with which this local access service module is logically associated, such that the connection data are propagated upward to the central master access service module along the hierarchy of local access service modules. This preferred embodiment makes it possible to access all local bank-note processing machines and all bank-note processing machines of the subordinate local access service modules from a local access service module directly (i.e. without any detours via local access service modules of lower levels). Further, this preferred embodiment allows the central master access service module to be able to produce a connection with all bank-note processing machines of the total system. This preferred embodiment is advantageous in particular for the real-time monitoring of the bank-note processing machines or for requesting status reports of the bank-note processing machines.

According to a preferred embodiment, a bank-note processing machine is adapted for transmitting, during operation, after the bank-note processing machine has logged in to the local access service module with which the bank-note processing machine is logically associated, an active signal to this local access service module, preferably at regular time intervals, in order to indicate to this local access service module that the relevant bank-note processing machine is in operation or on-line. In this preferred embodiment, there is preferably maintained by the local access service module a list specifying the bank-note processing machines that are logically associated with the local access service module, including their connection data, e.g. the IP addresses of the bank-note processing machines, as well as their operating states, e.g. on-line or off-line.

A local access service module is preferably respectively adapted such that when one of the bank-note processing machines associated with this local access service module is not on-line, the local access service module only relays changes of the configuration data to this bank-note processing machine as soon as said machine is on-line again.

Preferably, a local access service module is adapted such that when the connection data of a bank-note processing machine, e.g. its IP address or its port number, change, they are automatically updated in the local access service module with which this bank-note processing machine is associated. Advantageously, this preferred embodiment allows the employment of DHCP (dynamic host configuration protocol).

Preferably, the configuration data that are stored in the central master access service module, in the local access service modules and in the bank-note processing machines further contain security setting data which relate to the security settings of a respective bank-note processing machine, such as for example the minimum length of user passwords, the length of the password history, or the number of failed log-in attempts until a user account is locked. According to a preferred embodiment, the security setting data contain local security setting data and global security setting data. The central master access service module and the local access service modules are adapted here such that the local security setting data are distributed only to those bank-note processing machines that are logically associated directly or indirectly (i.e. via one or more further local access service modules of lower levels) with a certain local access service module for which these local security settings are to hold, and the global security settings are distributed to all bank-note processing machines. According to the invention, such a distinction between local and global data is also conceivable for the other kinds of data described here, e.g. the configuration data.

Preferably, at least one of the multiplicity of bank-note processing machines comprises a checking device with which measuring data of bank notes processed with the bank-note processing machine are captured. The local access service module with which this bank-note processing machine is associated is adapted for relaying the measuring data arising on the bank-note processing machine to the central master access service module which the other local access service modules can access, to be analyzed there, where applicable. This makes it possible for example that the measuring data and, where applicable, analysis data of bank-note processing machines are retrievable also from spatially remote sites, e.g. by means of a further bank-note processing machine or a separate client computer on which suitable evaluation/analysis software is installed.

Preferably, the central master access service module interacts with a serial-number management application which is adapted for maintaining a central serial-number archive. Said serial-number management application incorporates serial numbers that are extracted from the measuring data which are respectively provided by the checking device of a bank-note processing machine. Preferably, this extraction of the serial numbers is effected locally on the bank-note processing machines.

According to a preferred embodiment of the invention, the central master access service module interacts with a servicing application which is adapted for determining a respective bank-note processing machine's need for servicing on the basis of operating data of the bank-note processing machine which are made available to the central master access service module via the logical hierarchy of access service modules, and for prompting the servicing of a bank-note processing machine, where applicable.

Although the hereinabove described applications are preferably implemented together with the central master access service module on the central server, it is likewise conceivable according to the present invention that one of these applications can also be implemented on a local server or a bank-note processing machine, in order to access data from there, e.g. the measuring data provided by the bank-note processing machines and stored on the central server.

According to a second aspect of the invention, there is provided a method for processing value documents, in particular bank notes, by means of a multiplicity of bank-note processing machines. The method comprises the step of logically associating a first bank-note processing machine with a first local access service module, and a second bank-note processing machine with a second local access service module, wherein the bank-note processing machines are connected and can communicate with each other via a communication network, and the bank-note processing machines respectively have stored therein configuration data which define the operating configuration of a respective bank-note processing machine. Further, the method comprises the step of providing a central master access service module which likewise has configuration data stored therein and which is in communication with the first local access service module and the second local access service module via the communication network. The central master access service module, the first local access service module and the second local access service module define a logical hierarchy of access service modules in the form of a tree structure, in which the central master access service module constitutes the root of the tree structure and is adapted such that a change of the configuration data stored in the central master access service module leads to the changed configuration data being automatically transferred via the hierarchy of access service modules in the form of a tree structure and the first and second local access service modules contained therein to the first bank-note processing machine and the second bank-note processing machine, and leading there to a change of the configuration data and thus of the configuration of the first bank-note processing machine and of the second bank-note processing machine.

The person skilled in the art will appreciate that the hereinabove described preferred embodiments can be advantageously implemented within the framework of the first aspect of the invention, i.e. within the framework of a system for processing value documents, as well as within the framework of the second aspect of the invention, i.e. within the framework of a method for processing value documents.

BRIEF DESCRIPTION OF THE DRAWINGS

Further features, advantages and objects of the invention can be found in the following detailed description of several exemplary embodiments and alternative embodiments. Reference is made to the drawings, in which there are shown.

DETAILED DESCRIPTION OF VARIOUS EMBODIMENTS

Figure 1:
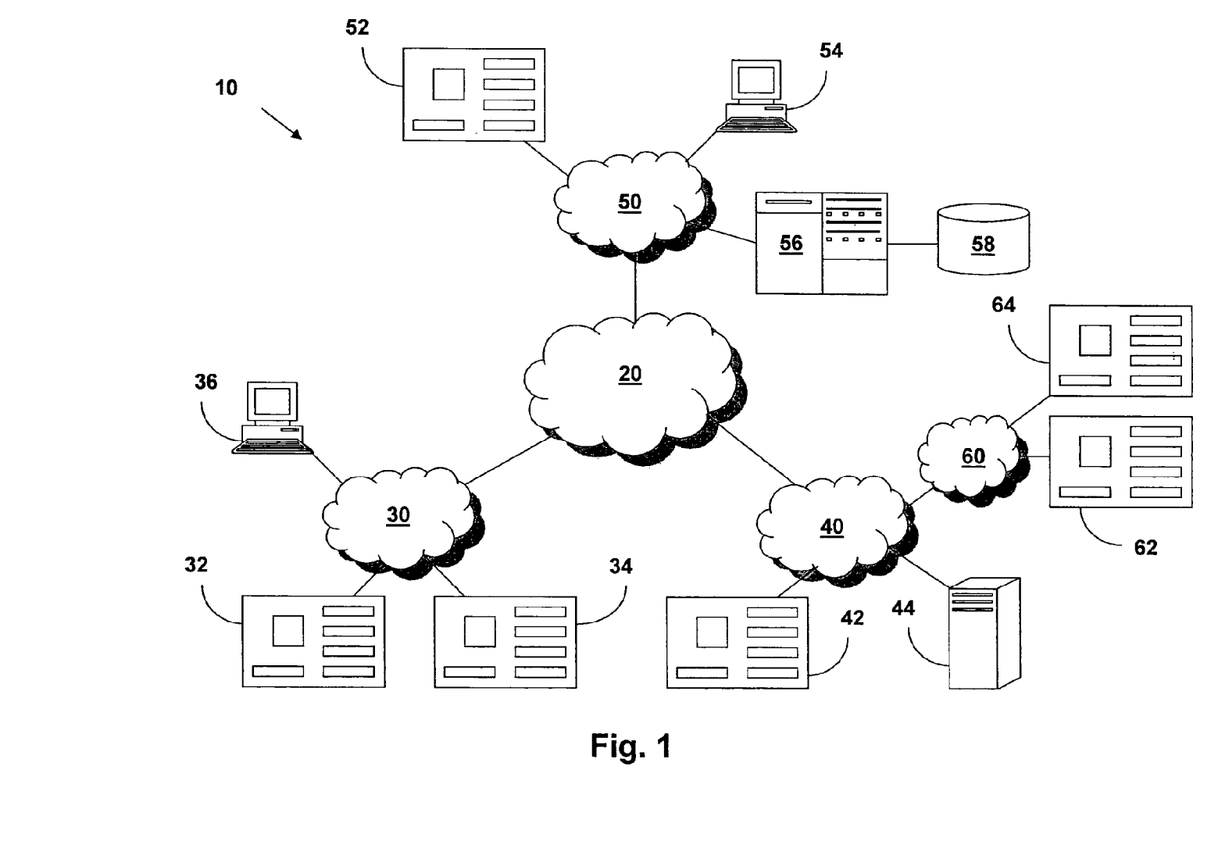
FIG. 1 a schematic representation of a preferred embodiment of a system for processing bank notes, FIG. 2 a schematic detail view of a bank-note processing machine of the system for processing bank notes of FIG. 1, and FIG. 3 a schematic representation of the logical association of the bank-note processing machines of the system of FIG. 1 with respective access service modules implemented in the system, according to a preferred embodiment of the invention.

FIG. 1 shows a schematic representation of a system 10 for processing bank notes according to a preferred embodiment of the invention. The system 10 comprises a plurality of bank-note processing machines, namely the bank-note processing machines 32, 34, 42, 52, 62 and 64, which are respectively integrated into a local network (local area network; LAN), namely the LANs 30, 40, 50 and 60. The LAN 30 consists by way of example of the two bank-note processing machines 32 and 34 and a client computer 36. The LAN 40 consists by way of example of the bank-note processing machine 42 and a local server 44. The LAN 50 comprises by way of example, besides the bank-note processing machine 52 and a client computer 54, a central server 56 which can be connected to a database 58 for keeping large amounts of data. The LAN 60, which comprises by way of example the bank-note processing machines 62 and 64, is by way of example a subnetwork of the LAN 40.

In the preferred embodiment represented in FIG. 1, the LANs 30, 40, 50 and 60 are interconnected via a communication network 20 such that their components can communicate with each other. The communication network 20 can be for example a public wide area network (in particular the Internet) or a non-public wide area network (e.g. the non-public network of a major bank).

Figure 2:
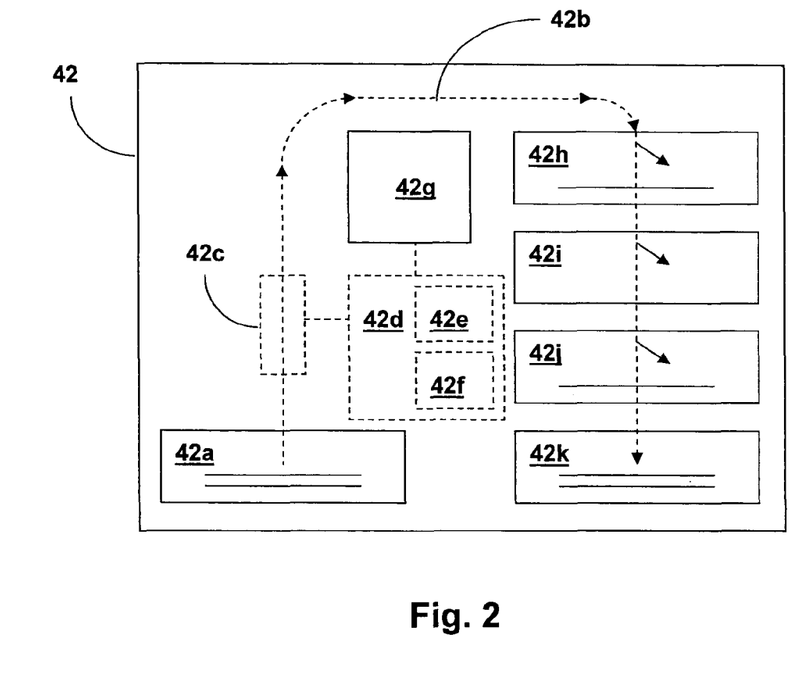

FIG. 2 shows a detail view of the exemplary bank-note processing machine 42, which can, but need not, be identically constructed to the other bank-note processing machines 32, 34, 52, 62 and 64 represented in FIG. 1. However, the bank-note processing machines 32, 34, 52, 62 and 64 will usually have similar components to the bank-note processing machine 42, in particular an input portion, a checking device, a control device and an output portion.

On the face or front side, the bank-note processing machine 42 has an input pocket 42a into which a stack of bank notes can be inserted for processing by the bank-note processing machine 42, as indicated schematically in FIG. 2. In the preferred embodiment represented in FIG. 2, the bank notes are inserted into the input pocket 42a with their long side or longitudinal side facing an operating person sitting or standing in front of the bank-note processing machine 42. The bank notes are singled out of the input pocket 42a by means of a suitable singling device (not shown) and transferred to a first portion of a following transport system 42b of the bank-note processing machine 42, which first feeds the singled bank notes to a checking device 42c. As is known to the person skilled in the art, the transport system 42c of the bank-note processing machine 42 can be realized for example by means of a multiplicity of guiding or diverting elements and belt-driven driving rollers. By means of the checking device 42c there can be tested selectable criteria of a bank note being moved through the checking device 42c. Depending on this check, the bank notes are fed, in the further course of the transport system 42c of the bank-note processing machine 42, to one of the output pockets 42h-k preferably through the suitable actuation of a multiplicity of gate devices. On the face or front side of the bank-note processing machine 42 there is further provided a touch-screen 42g on which information about the operating state of the bank-note processing machine 42 can be displayed and/or the user can make changes in the operating state of the bank-note processing machine 42.

Specifically, the bank-note processing machine 42 represented in FIG. 2 works as follows. The bank notes inserted into the input pocket 42a are fed by means of the singling device consecutively, bank note by bank note, to the transport system 42b of the bank-note processing machine 42. The transport system 42b transports the bank notes and guides them through the checking device 42c which is adapted for determining measuring data with regard to at least one physical (e.g. optical) property of a bank note guided through the checking device 42c. The thus determined measuring data of the bank note are employed by a control device 42d, connected to the checking device 42c, of the bank-note processing machine 42 for associating the bank note with a certain class by comparing the measuring data with classification data stored in the control device 42d, and for feeding it to one of the output pockets 42h-k according to this classification. The possible classes from which one can be selected are for example the denominations of the different bank notes. Possible classes can then be provided for example for 5, 10, 20, 50, 100, 200 and 500 euro notes. However, the establishment of a class can in general also be effected with regard to authenticity and/or fitness, i.e. the suitability of the bank note for reuse. The individual possible classes then reflect for example different degrees of authenticity or fitness of the bank notes, such as for example "authentic", "circulable", "to be destroyed", and the like. Preferably, the checking device 42c is a device having suitable light sources and/or sound sources and optical/acoustic sensors for measuring optical/acoustic properties, e.g. the absorption behavior and/or reflection behavior, of a bank note in one or more selected wavelength regions, and thus for producing measuring data of a respective bank note.

In the preferred embodiment represented in FIG. 2, the control device 42d of the bank-note processing machine 42 comprises a processor unit 42e and a memory unit 42f. The control device 42c may, according to a preferred embodiment of the invention, be an industrial PC or a corresponding mainboard. The memory unit 42f of the control device 42d, which may be e.g. a non-volatile memory in the form of a fixed-disk memory or a flash memory, preferably has installed thereon a conventional PC operating system, e.g. Windows or Linux. Besides the operating system, the memory unit 42f of the control unit 42d can have installed thereon further software modules which provide certain applications, for example for operating the bank-note processing machine 42 or for processing the measuring data provided by the checking device 42c.

The memory unit 42f of the control unit 42d further has stored therein configuration data which define different operating parameters, i.e. a certain operating configuration or a certain operating state of the bank-note processing machine 42. Preferably, the configuration data contain the hereinabove mentioned classification data which the control unit 42d employs, together with the measuring data obtained from a bank note, for classifying a bank note. For example, the classification data can define a maximum threshold value for a bank note's degree of soiling. If a corresponding measurement value related to a bank note's degree of soiling, which may be a directly measured measurement value or a measurement value derived from other measurement values and which is part of the measuring data provided by the checking device 42c, exceeds the maximum threshold value for a bank note's degree of soiling, the control unit 42d can classify the corresponding bank note as no longer fit for circulation and feed it to an output pocket intended for such bank notes, for example to one of the output pockets 42h-k.

Figure 3:
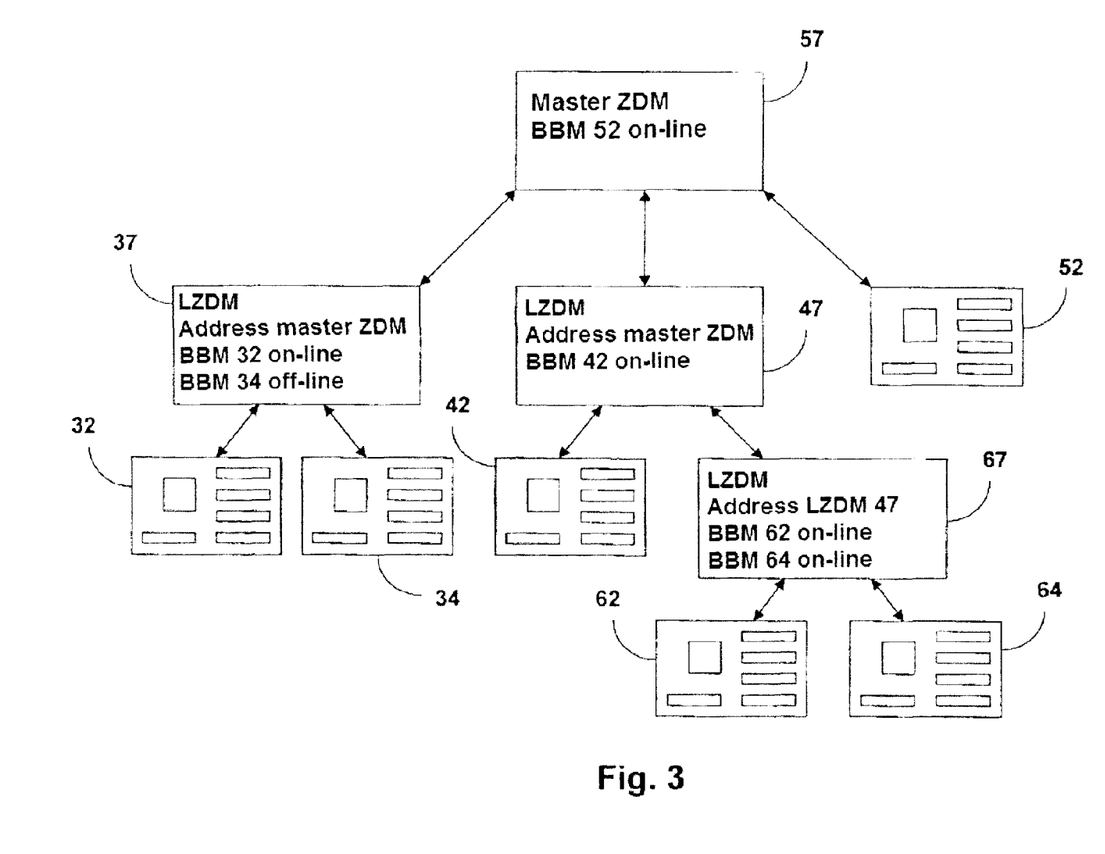

As can be taken from the schematic representation of FIG. 3, the bank-note processing machine 42 (BBM 42) is logically associated with a local access service module 47 (LZDM 47) according to the invention. As will be described in detail hereinafter, the local access service module 47 is adapted in particular for managing information about the bank-note processing machines that are associated with this local access service (in this case the bank-note processing machine 42), and further for controlling the flow of data from and to these bank-note processing machines.

The local access service module 47 is preferably adapted as software which is stored and executed on the local server 44. As already described in connection with FIG. 1, the local server 44 on which the local access service module 47 is stored, together with the bank-note processing machine 42 which is logically associated with this local access service module 47, constitutes part of the local network 40.

Instead of being implemented on a local server, as is the case with the local access service module 47 implemented on the local server 44, a local access service module can also be implemented on a bank-note processing machine. As can be taken from FIG. 3 again, the bank-note processing machines 32 and 34 are for example logically associated with the local access service module 37. Physically, the local access service module 37 could be implemented, however, on the bank-note processing machine 32 or the bank-note processing machine 34 which are part of the local network 30. According to yet another alternative, a local access service module can also be adapted as a hardware component e.g. in the form of an access service gateway.

Preferably, the local access service module 37 and the local access service module 47 are part of the logical hierarchy of access service modules in the form of a tree structure that is schematically represented in FIG. 3. The root of this logical hierarchy of access service modules in the form of a tree structure is constituted by a central master access service module 57 (master ZDM 57), which is preferably stored and executed as software on the central server 56. As can be taken from FIG. 1, the central master access service module 57 implemented on the central server 56 is physically in communication via the communication network 20 with the local access service module 37, which can be implemented for example on the bank-note processing machine 32, and with the local access service module 47, which is implemented on the local server 44.

In the logical hierarchy of access service modules in the form of a tree structure as defined by the central master access service module 57, the local access service module 37 and the local access service module 47, the local access service module 37 and the local access service module 47 are located a level below the central master access service module 57, i.e. a level below the root of the tree structure. At this level there is likewise located the bank-note processing machine 52 which, like the central server 56, is part of the local network 50 and is logically associated with the central master access service module 57.

Besides the bank-note processing machine 42, there is logically associated with the local access service module 47 a further local access service module 67 which is disposed a level lower than the local access service module 47 in the logical hierarchy of access service modules in the form of a tree structure as represented in FIG. 3. Logically associated with the local access service module 67 are the bank-note processing machines 62 and 64 which are part of the subnetwork 60 of the local network 40.

As can be taken from FIG. 3, there is preferably respectively located on the "leaves" of the logical hierarchy of access service modules in the form of a tree structure a bank-note processing machine, namely the bank-note processing machines 32, 34, 42, 52, 62 and 64, which are logically associated with the local access service modules 37, 47 and 67 or, in the case of the bank-note processing machine 52, directly with the central master access service module 57.

Preferably, the central server 56 and/or the database 58 have stored thereon centrally configuration data which define the operating configuration of the bank-note processing machines. The central master access service module 57 is preferably adapted here, by reason of the hierarchy of access service modules in the form of a tree structure as described hereinabove in connection with FIG. 3, such that a change of the configuration data stored on the central server 56 and/or the database 58 leads to the changed configuration data being relayed via the hierarchy of access service modules to the bank-note processing machines 32, 34, 42, 52, 62 and 64 located on the "leaves" of the tree structure, and said machines being operated on the basis of the changed configuration data, i.e. the configuration data stored there being replaced by the changed configuration data. In the case of the bank-note processing machines 32 and 34 or 42, a relaying of the changed configuration data is effected through the local access service module 37 or 47. With the bank-note processing machines 62 and 64, the relaying of the changed configuration data is effected over two levels of the logical hierarchy of local access service modules, namely over the local access service modules 47 and 67. The bank-note processing machine 52 which is logically associated with the central master access service module 57 receives the changed configuration data directly from the central master access service module 57.

Instead of relaying the changed configuration data to all bank-note processing machines 32, 34, 42, 52, 62 and 64, the central master access service module 57 can be adapted for distributing the changed configuration data only to selected local access service modules and/or selected bank-note processing machines. Corresponding filter settings can also be made on the local access service modules 37, 47 and 67. A further option is that the central master access service module 57 provides the changed configuration data with activation times and/or deactivation times. This has the consequence that the bank-note processing machines 32, 34, 42, 52, 62 and 64 can be operated with the changed configuration data only within the time period defined by an activation time and/or a deactivation time. This makes it possible for example to define a uniform time for all bank-note processing machines 32, 34, 42, 52, 62 and 64 as of when changed configuration data are to, or can, be employed for operation.

Preferably, the bank-note processing machines 32, 34, 42, 52, 62 and 64 respectively have stored therein connection data for setting up a connection with a respective local access service module 37, 47 or 67 (or, in the case of the bank-note processing machine 52, with the central master access service module 57) with which a bank-note processing machine 32, 34, 42, 52, 62 and 64 is associated. The connection data can contain e.g. the IP address and/or the port number of the local access service module 37, 47 or 67 or of the physical unit on which the local access service module 37, 47 or 67 is implemented. As the person skilled in the art will appreciate, the logical association of the bank-note processing machines 32, 34, 42, 62 and 64 with one of the local access service modules 37, 47 and 67 is effected in this case by reason of the connection data respectively stored in the bank-note processing machines. Alternatively or additionally, the logical association of the bank-note processing machines 32, 34, 42, 62 and 64 with one of the local access service modules 37, 47 or 67 can be effected by a local access service module 37, 47 and 67 respectively searching independently for bank-note processing machines that are hitherto not logically associated, e.g. in the local network in which the local access service module 37, 47 or 67 is implemented.

As is indicated schematically in FIG. 3, the local access service modules can preferably respectively have stored therein connection data (e.g. IP address and/or port number) for setting up a connection with a respective local access service module of a higher level or, where applicable, with the central master access service module 57 with which a respective local access service module is logically associated. Thus, in the preferred embodiment represented in FIG. 3, the local access service modules 37 and 47 have stored therein the connection data of the central master access service module 57, and the local access service module 67 which is logically associated with the local access service module 47 has stored therein the connection data of the local access service module 47.

Preferably, the local access service modules 37, 47 and 67 are adapted such that when the connection data of one of the bank-note processing machines 32, 34, 42, 62 or 64 change, e.g. its IP address or its port number, these are automatically updated in the local access service module with which this bank-note processing machine is associated. Advantageously, this preferred embodiment allows the employment of DHCP (dynamic host configuration protocol).

The bank-note processing machines 32, 34, 42, 52, 62 and 64 are preferably respectively adapted for automatically logging in, at start-up, to the local access service module with which the bank-note processing machine is logically associated, and logging out from this local access service module again when the bank-note processing machine is switched off. This can be effected for example by a bank-note processing machine transmitting its IP address at start-up to the local access service module with which this bank-note processing machine is logically associated. Further, according to a preferred embodiment, the bank-note processing machines 32, 34, 42, 52, 62 and 64 are respectively adapted for transmitting, during operation, after a bank-note processing machine has logged in to the local access service module with which the bank-note processing machine is logically associated, an active signal to this local access service module, preferably at regular time intervals, in order to indicate to this local access service module that the relevant bank-note processing machine is in operation. In this preferred embodiment, there is preferably respectively maintained by the local access service modules 37, 47 and 67 a list specifying the bank-note processing machines that are logically associated with the local access service, including their connection data, e.g. the IP addresses of the bank-note processing machines, as well as their operating states, e.g. on-line or off-line. Preferably, the local access service modules 37, 47 and 67 are respectively adapted such that when one of the bank-note processing machines 32, 34, 42, 62 and 64 associated with these local access service modules 37, 47 and 67 is not on-line, the relevant local access service module 37, 47 and 67 holds changed configuration data until the relevant bank-note processing machine is on-line again, to thereupon relay the changed configuration data to the relevant bank-note processing machine.

According to a preferred embodiment, the local access service modules 37, 47 and 67 are preferably adapted for relaying the connection data which the local access service modules 37, 47 and 67 receive from the bank-note processing machines 32, 34; 42 and 62, 64 to the central master access service module 57 or, in the case of the local access service module 67, first to the local access service module 47 and from there to the central master access service module 57, such that the connection data are propagated to the central master access service module 57 upward along the hierarchy of local access service modules 37, 47 and 67.

According to a preferred embodiment of the invention, the central server 56 having the central master access service module 57 implemented thereon further has a serial-number management application implemented thereon. The serial-number management application preferably maintains on the database 58 a serial-number archive, in which newly determined serial numbers of bank notes are stored and serial numbers of bank notes that have already been entered can be retrieved. Said serial-number management application incorporates serial numbers that are extracted for example by means of the control device of a bank-note processing machine from the measuring data that are respectively provided by the checking device of one of the bank-note processing machines 32, 34, 42, 52, 62 and 64. Preferably, this extraction of the serial numbers is effected locally on the bank-note processing machines 32, 34, 42, 52, 62 and 64.

Preferably, the measuring data provided by the checking device of one of the bank-note processing machines 32, 34, 42, 52, 62 and 64 comprise for this purpose image data of a respective bank note by which the serial number of a bank note can be determined. In the serial-number archive the serial number determined for a bank note is preferably stored together with further data relating to the bank note, such as e.g. the bank-note value, the bank-note processing machine with which this bank note was processed, date and time of the processing, and the like. By means of these serial-number data stored in the serial-number archive, the serial-number management application is able to supervise the bank-note circulation between the bank-note processing machines 32, 34, 42, 52, 62 and 64 which are connected via the logical hierarchy of access service modules, represented in FIG. 3, with the central master access service module 57 implemented on the central server 56. Further, the serial-number management application is able for example to more easily recognize false money, or retrieve marked bank notes whose serial numbers are known, using the serial-number archive.

According to a preferred embodiment of the invention, the central server 56 having the central master access service module 57 implemented thereon further has a servicing application implemented thereon, which is adapted for determining and supervising the need for servicing of a respective bank-note processing machine 32, 34, 42, 52, 62 and 64 on the basis of operating data of the bank-note processing machines 32, 34, 42, 52, 62 and 64 which are made available to the central master access service module 57 via the logical hierarchy of access service modules represented in FIG. 3. The servicing application implemented on the central server 56 can for example determine the need for servicing of a respective bank-note processing machine 32, 34, 42, 52, 62 and 64 by comparing the operating data (e.g. the bank-note throughput) of one of the bank-note processing machines 32, 34, 42, 52, 62 and 64 with the operating data of the other bank-note processing machines 32, 34, 42, 52, 62 and 64. If this comparison yields a drop in performance of the one bank-note processing machine, the servicing application executed on the central server 56 can prompt a servicing of this bank-note processing machine. Alternatively or additionally, the servicing application provided on the central server 56 can prompt the servicing of one of the bank-note processing machines 32, 34, 42, 52, 62 and 64 on the basis of the operating data provided by the bank-note processing machines 32, 34, 42, 52, 62 and 64 when for example the operating data of this bank-note processing machine indicate that the latter has processed a number of bank notes that is greater than a definable threshold value. The operating data provided by a bank-note processing machine can additionally contain for example information about the error cases that have occurred in a bank-note processing machine, such as e.g. the malfunctioning of a component of a bank-note processing machine, the formation of a bank-note jam at a certain place in the bank-note processing machine, and the like. Preferably, the servicing application implemented on the central server 56 is arranged for prompting, by reason of the information about error cases occurring in bank-note processing machines for example on average after the processing of a certain number of bank notes, the servicing of a bank-note processing machine of this type in which this error case has hitherto not occurred.

Preferably, the configuration data that are stored in the central master access service module and the bank-note processing machines further contain security setting data which relate to the security settings of a respective bank-note processing machine, such as for example the minimum length of user passwords, the length of the password history or the number of failed log-in attempts until a user account is locked. According to a preferred embodiment, the security setting data contain local security setting data and global security setting data. The central master access service module and the local access service modules are adapted here such that the local security setting data are distributed only to those bank-note processing machines that are logically associated with certain local access service modules for which these local security settings are to hold, and the global security settings are distributed to all processing machines.

According to the invention, such a distinction between local and global data is also conceivable for the other kinds of data described here, e.g. the configuration data.

The invention claimed is:

1. A system for processing value documents, wherein the system comprises:
   a multiplicity of bank-note processing machines which can communicate via a communication network and which respectively have stored therein configuration data, the configuration data defining the operating configuration of a respective bank-note processing machine, wherein said bank-note processing machines comprises an input section, a checking device, at least two output sections having a plurality of output pockets, and a transport system to transport a banknote from the input section past the checking device to one of the output pockets, and wherein at least a first bank-note processing machine is logically associated with a first local access service module, and at least a second bank-note processing machine is logically associated with a second local access service module, wherein the first local access service module and the second local access service module are adapted for managing information about the first and the second bank-note processing machines, respectively, and for respectively controlling the flow of data from and to said first and second bank-note processing machines; and
   a central master access service module which has configuration data stored therein and which is in communication via the communication network with the first local access service module and the second local access service module;
   wherein the central master access service module, the first local access service module and the second local access service module form a logical hierarchy of access service modules in the form of a tree structure, in which the central master access service module constitutes the root of the tree structure and is adapted such that a change of the configuration data stored in the central master access service module leads to the changed configuration data being automatically transferred via the hierarchy of access service modules to the first and the second bank-note processing machine, and leading there to a change of the configuration data of the first and the second bank-note processing machine, and
wherein the bank-note processing machines are adapted for searching independently for a local access service module.

2. The system according to claim 1, wherein the first local access service module and the second local access service module are adapted as software which is stored and executed on a respective local server.

3. The system according to claim 1, wherein the central master access service module is stored as software on a central server and executed there, or is implemented on one of the multiplicity of bank-note processing machines.

4. The system according to claim 1, wherein there is respectively disposed on the respective leaves of the logical hierarchy of access service modules in the form of a tree structure a bank-note processing machine which is logically associated with a local access service module of a higher level of the tree structure or with the master access service module.

5. The system according to claim 1, wherein the central master access service module is adapted for distributing the changed configuration data only to selected local access service modules and/or selected bank-note processing machines.

6. The system according to claim 1, wherein connection data for setting up a connection with the local access service module with which a bank-note processing machine is associated are stored in the bank-note processing machines.

7. The system according to claim 1, wherein the configuration data that are stored in the central master access service module and the bank-note processing machines further contain security setting data, wherein the security setting data contain local security setting data which are distributed only to those bank-note processing machines that are logically associated with certain local access service modules for which these local security settings are to hold, and global security setting data which are distributed to all bank-note processing machines.

8. The system according to claim 1, wherein the central master access service module interacts with a serial-number management application which is adapted for maintaining a central serial-number archive, wherein the serial-number management application incorporates serial numbers that are extracted from measuring data which are provided respectively by a checking device of one of the bank-note processing machines, and wherein the extraction of the serial numbers is effected locally on the bank-note processing machines.

9. The system according to claim 1, wherein the central master access service module interacts with a servicing application which is adapted for determining the need for servicing of a respective bank-note processing machine on the basis of operating data of the bank-note processing machines which are made available to the central master access service module via the logical hierarchy of access service modules, and for prompting the servicing of a bank-note processing machine, where applicable.

10. The system according to claim 1, wherein the first local access service module and the second local access service module are adapted as software which is stored and executed on one of the multiplicity of bank-note processing machines.

11. The system according to claim 1, wherein the central master access service module is adapted for providing the changed configuration data to selected ones of the local access service modules and/or selected ones of the bank-note processing machines with activation times such that a bank-note processing machine can be operated with the changed configuration data only within a period of validity defined by an activation time.

12. The system according to claim 1, wherein the central master access service module is adapted for providing the changed configuration data to selected ones of the local access service modules and/or selected ones of the bank-note processing machines with deactivation times such that a bank-note processing machine can be operated with the changed configuration data only within a period of validity defined by a deactivation time.

13. The system according to claim 1, wherein the configuration data that are stored in the central master access service module and the bank-note processing machines further contain security setting data, the security setting data including local security setting data which are distributed only to those bank-note processing machines that are logically associated with certain local access service modules for which these local security settings are to hold.

14. The system according to claim 1, wherein the configuration data that are stored in the central master access service module and the bank-note processing machines further contain security setting data, the security setting data including global security setting data which are distributed to all bank-note processing machines.

15. The system according to claim 1, wherein the central master access service module interacts with a serial-number management application which is adapted to maintain a central serial-number archive, and wherein the serial-number management application stores serial numbers that are extracted from bank notes processed by one or more of the bank-note processing machines.

16. The system according to claim 1, wherein at least one of the multiplicity of bank-note processing machines includes a checking device configured to recognize whether a bank note is fit for circulation.

17. The system according to claim 1, wherein at least one of the multiplicity of bank-note processing machines includes a checking device configured to recognize whether a bank note is fit for circulation.

18. The system according to claim 1, wherein at least one of the multiplicity of the bank-note processing machines includes a shredder configured to destroy selected bank notes.

19. A system for processing value documents, wherein the system comprises:
a multiplicity of bank-note processing machines which can communicate via a communication network and which respectively have stored therein configuration data, the configuration data defining the operating configuration of a respective bank-note processing machine, wherein said bank-note processing machines comprises an input section, a checking device, at least two output sections having a plurality of output pockets, and a transport system to transport a banknote from the input section past the checking device to one of the output pockets, and wherein at least a first bank-note processing machine is logically associated with a first local access service module, and at least a second bank-note processing machine is logically associated with a second local access service module, wherein the first local access service module and the second local access service module are adapted for managing information about the first and the second bank-note processing machines, respectively, and for respectively controlling the flow of data from and to said first and second bank-note processing machines; and
a central master access service module which has configuration data stored therein and which is in communication via the communication network with the first local access service module and the second local access service module;
wherein the central master access service module, the first local access service module and the second local access service module form a logical hierarchy of access service modules in the form of a tree structure, in which the central master access service module constitutes the root of the tree structure and is adapted such that a change of the configuration data stored in the central master access service module leads to the changed configuration data being automatically transferred via the hierarchy of access service modules to the first and the second bank-note processing machine, and leading there to a change of the configuration data of the first and the second bank-note processing machine, and
wherein the first local access service module and the second local access service module are adapted as hardware in the form of an access service gateway.

* * * * *